United States Patent
Zhou et al.

(10) Patent No.: US 9,560,545 B1
(45) Date of Patent: Jan. 31, 2017

(54) SYSTEMS AND METHODS FOR MANAGING COMMUNICATION BETWEEN AN ACCESS NODE AND A RELAY NODE

(71) Applicant: Sprint Spectrum LP, Overland Park, KS (US)

(72) Inventors: Yu Zhou, Herndon, VA (US); Muhammad Ahsan Naim, Sterling, VA (US)

(73) Assignee: Sprint Spectrum L.P., Overland Park, KS (US)

(*) Notice: Subject to any disclaimer, the term of this patent is extended or adjusted under 35 U.S.C. 154(b) by 97 days.

(21) Appl. No.: 14/334,026

(22) Filed: Jul. 17, 2014

(51) Int. Cl.
*H04W 28/02* (2009.01)
*H04W 40/04* (2009.01)

(52) U.S. Cl.
CPC ......... *H04W 28/0252* (2013.01); *H04W 40/04* (2013.01)

(58) Field of Classification Search
CPC .......................... H04W 28/0252; H04W 40/04
See application file for complete search history.

(56) References Cited

U.S. PATENT DOCUMENTS

| | | | |
|---|---|---|---|
| 2009/0163220 A1* | 6/2009 | Liu | H04W 72/0453 455/452.1 |
| 2012/0163287 A1 | 6/2012 | Raaf et al. | |
| 2012/0276945 A1* | 11/2012 | Chindapol | H04W 48/20 455/525 |
| 2014/0293867 A1* | 10/2014 | Horiuchi | H04W 16/14 370/315 |

* cited by examiner

*Primary Examiner* — Mohammad Anwar (57) ABSTRACT

Systems and methods are described for managing communications of an access node and a relay node. Data may be communicated between an access node and a plurality of wireless devices over a first frequency band. Data may also be communicated between the access node and a relay node over the first frequency band, where the relay node may communicate with wireless devices over a second frequency band. It may be determined that a utilization of the second frequency band meets a criteria. Data may then be communicated between the access node and at least one of the plurality of wireless device over the second frequency band based on the determination that the utilization of the second frequency band meets the criteria.

14 Claims, 7 Drawing Sheets

SYSTEMS AND METHODS FOR MANAGING COMMUNICATION BETWEEN AN ACCESS NODE AND A RELAY NODE

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience large amount of data traffic. Here, the efficiency of the system may suffer due to excessive load on a portion of the system. Accordingly, a system that effectively balances load may be able to provide a high quality service to users of the system.

Overview

Systems and methods are described for managing communications of an access node and a relay node. Data may be communicated between an access node and a plurality of wireless devices over a first frequency band. Data may also be communicated between the access node and a relay node over the first frequency band, where the relay node may communicate with wireless devices over a second frequency band. It may be determined that a utilization of the second frequency band meets a criteria. Data may then be communicated between the access node and at least one of the plurality of wireless device over the second frequency band based on the determination that the utilization of the second frequency band meets the criteria.

DETAILED DESCRIPTION

Figure 1:
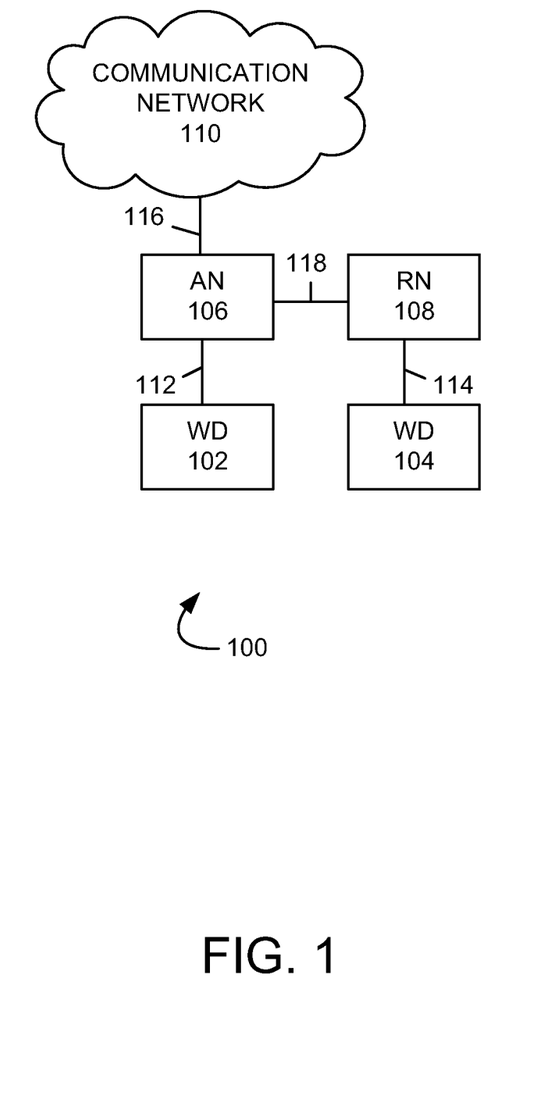
FIG. 1 illustrates an exemplary communication system to manage communications of an access node and a relay node.

FIG. 1 illustrates an exemplary communication system 100 to manage communications of an access node and a relay node comprising wireless devices 102 and 104, access node 106, relay node 108, communication network 110, and communication links 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106, relay node 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access node 106 and relay node 108, any number of wireless devices can be implemented.

Access node 106 and relay node 108 are network nodes capable of providing wireless communications to wireless devices 102 and 104, and can be, for example, a base transceiver station, a radio base station, or an eNodeB device. In an embodiment, access node 106 may comprise a macro cell while relay node 108 may comprise a small cell (e.g., femto cell, pico cell, micro cell, or the like) such that the coverage radius (e.g., the radius around each node where a wireless device may detect wireless signals transmitted from the node at a signal level above a threshold) for the macro cell is larger than the coverage radius for the small cell. As such, a macro cell may transmit wireless signals with a greater signal level (e.g., use a higher transmission power) than a small cell. Access node 106 may communicate with communication network 110 over communication link 116. Relay node 108 may communicate with communication network 110 via access node 106 or using a separate communication link (not illustrated). Access node 106 and relay node 108 may also communicate directly with each other over communication link 118.

Although only access node 106 and relay node 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
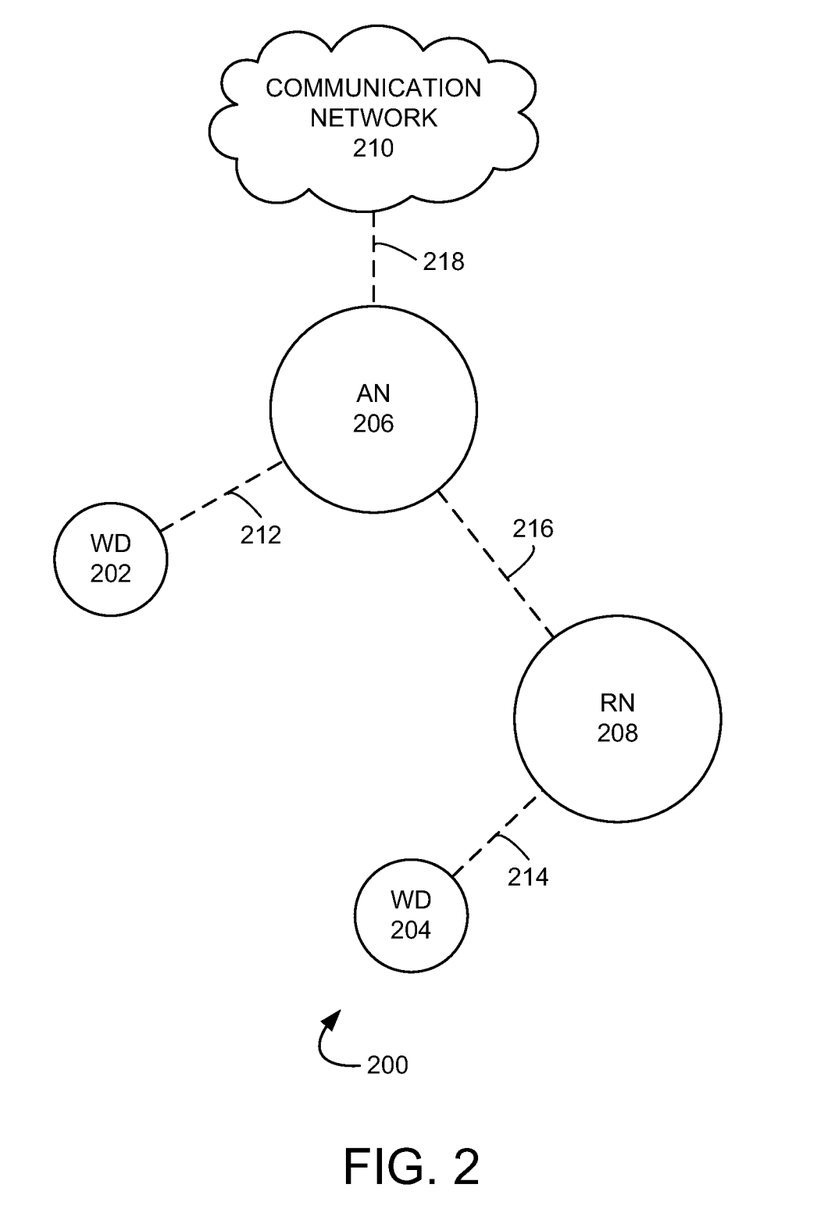
FIG. 2 illustrates another exemplary system to manage communications of an access node and a relay node.

FIG. 2 illustrates an exemplary communication system 200 for managing communications of an access node and a relay node. System 200 comprises wireless devices 202 and 204, access node 206, relay node 208, communication network 210, and communication links 212, 214, 216 and 218. Wireless devices 202 and 204 may comprise devices similar to wireless devices 102 and 104. Access node 206 may comprise an access node similar to access node 106 and relay node 208 may comprise a relay node similar to relay node 108. Communication network 210 may comprise a network similar to communication network 110. Communication links 212, 214, 216 and 218 may comprise links similar to communication links 112, 114, 116, and 118 of FIG. 1.

In operation, access node 206 may establish communication with wireless device 202 such that access node 202 provides the wireless device access to a communication network (e.g., communication network 210). Similarly, relay node 208 may establish communication with wireless device 204 such that relay node 208 provides the wireless device access to a communication network (e.g., communication network 210).

In an embodiment, access node 206 may comprise a macro cell and relay node 208 may comprise a small cell (e.g., femto cell, pico cell, micro cell, or the like). For instance, the coverage radius for the macro cell may be larger than the coverage radius for the small cell. In this example, relay node 208 may communicate with access node 206 in order to communicate with a communication network (e.g., communication network 210).

For example, access node 206 may be in communication with communication network 210 such that communication network 210 provides wireless services for wireless devices 202 and 204. Communication network 210 may comprise a core network that includes, for example, a controller node, a gateway node, and any other suitable network elements. The core network may perform functions in order to provide wireless service for wireless devices 202 and 204. For example, an element of the core network (e.g., a controller node) may instruct network elements to establish a data bearer for wireless device 202. Accordingly, a data bearer may be established throughout the core network such that data may be transmitted to and from wireless device 202 over the established data bearer. In another example, an element of the core network (e.g., a gateway node) may enable wireless device 202 to communicate with an external data network (e.g., the Internet). Here, data may be communicated between a gateway node and wireless device 202 such that wireless device 202 may communicate with the external network (e.g., the Internet).

In an embodiment, relay node 208 may communicate with communication network 210 using access node 206. For example, relay node 208 may transmit data to access node 206 such that the transmitted data is used to enable wireless device 204 to access an external network (e.g., the Internet) or to enable wireless device 204 to use services provided by the core network (e.g., voice services). Here, communication link 216 may be used to communicate data between access node 206 and relay node 208. Access node 206 may then transmit the data to and from communication network 210 (e.g., over communication link 218). In an embodiment, relay node 208 may be in direct communication with communication network 210 (e.g., using a communication link not depicted). Here, relay node 208 and communication network 210 may directly communicate for a first portion of traffic between the network elements and may use access node 206 for a second portion of traffic between the network elements. In another embodiment, relay node 208 may be in communication with a second access node (not depicted). Here, relay node 208 and communication network 210 may communicate using access node 206 for a first portion of traffic between the network elements and may communicate using the second access node for a second portion of traffic between the network elements.

In an embodiment, access node 206 and relay node 208 may communicate over the air (e.g., communication link 216 may comprise a wireless communication link). For example, a plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an example that implements a particular protocol, a system having a channel band of 5 MHz can comprise 300 subcarriers per unit of time, a system having a channel band of 10 MHz can comprise 600 subcarriers per unit of time, and a system having a channel band of 15 MHz can comprise 900 subcarriers per unit of time.

In an embodiment, system 200 may use a plurality of carriers in order to provide wireless communication services. A frequency band may comprise a carrier, a channel, a plurality of any of these, or any other suitable frequency band. Accordingly, a frequency band from a set of frequency bands may be used for communication between access node 206 and relay node 208. In addition, the set of frequency bands may be used for other wireless communication (e.g., communication between access node 206 and wireless devices in communication with access node 206, communication between relay node 208 and wireless devices in communication with relay node 208, and the like). A system that efficiently allocates wireless spectrum to access node 206 and relay node 208 may provide enhanced services to wireless devices using communication system 200.

Systems and methods are described for managing communications of an access node and a relay node. Data may be communicated between an access node and a plurality of wireless devices over a first frequency band. Data may also be communicated between the access node and a relay node over the first frequency band, where the relay node may communicate with wireless devices over a second frequency band. It may be determined that a utilization of the second frequency band meets a criteria. Data may then be communicated between the access node and at least one of the plurality of wireless device over the second frequency band based on the determination that the utilization of the second frequency band meets the criteria.

Figure 3:
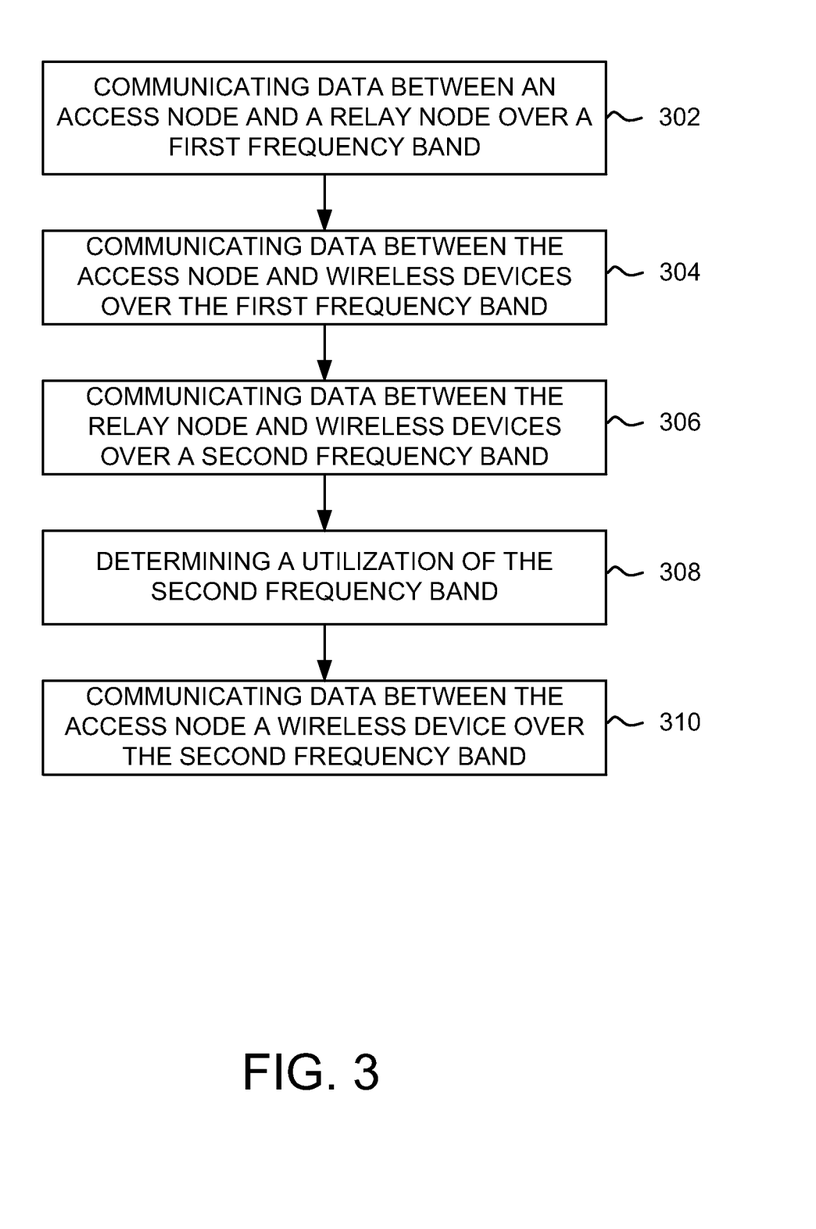
FIG. 3 illustrates an exemplary method of managing communications of an access node and a relay node.

FIG. 3 illustrates an exemplary method for managing communications of an access node and a relay node. The method will be discussed with reference to the exemplary communication system 200 illustrated in FIG. 2, however, the method can be implemented with any suitable communication system.

Referring to FIG. 3, at step 302, data may be communicated between an access node and a plurality of wireless devices over a first frequency band. For example, access node 206 may be capable of communicating with network elements (e.g., wireless devices, relay nodes, and the like) over a set of frequency bands. Access node 206 may communicate data with wireless device 202 over a first frequency band. For example, access node 206 may be instructed to communicate with wireless devices (e.g., wireless device 202) over the first frequency band.

At step 304, data may be communicated between the access node and a relay node over the first frequency band. For example, relay node 208 may be capable of communicating with network elements (e.g., wireless devices, access nodes, and the like) over a set of frequency bands. Access node 206 may communicate data with relay node 208 over the first frequency band. For example, access node 206 may be instructed to communicate with relay node 208 over the first frequency band. In this example, relay node 208 may also be instructed to communicate with access node 206 over the first frequency band.

At step 306, data may be communicated between the relay node and wireless devices over a second frequency band. For example, relay node 208 may communicate data with wireless devices (e.g., wireless device 204) over a second frequency band. In an embodiment, relay node 208 may be instructed to communicate with wireless devices (e.g., wireless device 204) over the second frequency band.

At step 308, it may be determined that a utilization of the second frequency band meets a criteria. For example, relay node 208 may communicate with wireless devices (e.g., wireless device 204) over the second frequency band. The utilization may comprise a number of subcarriers within the second frequency band being used for communication with wireless devices, a number of subframes within the second frequency band being used for communication with wireless devices, a number of connections using the second frequency band (e.g., a number of RRC connections), a data rate over the second frequency band (e.g., actual data rate per capacity data rate), a throughput over the second frequency band, and the like. The utilization may be compared to a utilization criteria (e.g., threshold number of subcarriers allocated for data communication, threshold number of RRC connections, threshold data rate, threshold throughput, and the like), and it may be determined that the utilization meets the utilization criteria.

At step 310, data may be communicated between the access node and at least one wireless device over the second frequency band based on the determination that the utilization of the second frequency band meets the utilization criteria. For example, access node 206 may communicate with wireless device 202 over the second frequency band based on the determination that the utilization of the second frequency band (e.g., the utilization of the second frequency band by relay node 208) meets the utilization criteria. In an embodiment, a portion of the second frequency band (e.g., a number of subframes) may be used for communication between access node 206 and wireless devices (e.g., wireless device 202).

Figure 4:
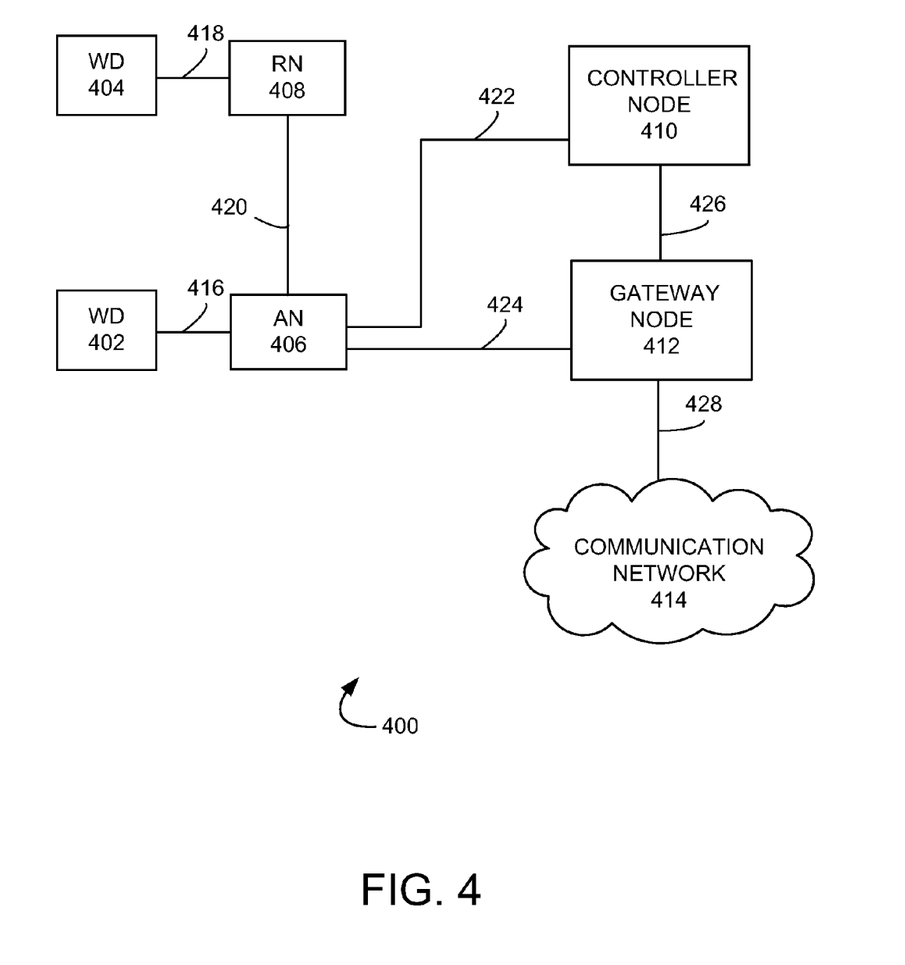
FIG. 4 illustrates another exemplary system to manage communications of an access node and a relay node.

FIG. 4 illustrates another exemplary communication system 400 to manage communications of an access node and a relay node. Communication system 400 may comprise wireless devices 402 and 404, access node 406, relay node 408, controller node 410, gateway node 412, communication network 414, and communication links 416, 418, 420, 422, 424, 426, and 428. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 and relay node 408 are network nodes capable of providing wireless communications to wireless devices 402 and 404, and can be, for example, a base transceiver station, a radio base station, or an eNodeB device. In an embodiment, access node 406 may comprise a macro cell while relay node 408 may comprise a small cell (e.g., femto cell, pico cell, micro cell, or the like) such that the coverage radius (e.g., the radius around each node where a wireless device may detect wireless signals transmitted from the node at a signal level above a threshold) for the macro cell is larger than the coverage radius for the small cell. As such, a macro cell may transmit wireless signals with a greater signal level (e.g., use a higher transmission power) than a small cell. In an embodiment, access node 406 can comprise a serving access node for wireless device 402 and rely node 408 can comprise a serving access node for wireless device 404. Access node 406 may communicate with controller node 410 over communication link 422 and with gateway node 412 over communication link 424. Access node 406 and relay node 408 may also communicate directly with each other over communication link 420. In an embodiment, rely node 408 can communicate directly with controller node 410 and gateway node 412 over communication links (not depicted).

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions.

Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access node 406 and relay node 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, and 428 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406 and relay node 408, controller node 410, gateway node 412, and communication network 414 which are omitted for clarity, including additional processing nodes, routers, gateways, and physical and/or wireless data links for carrying data among the various network elements.

Figure 5:
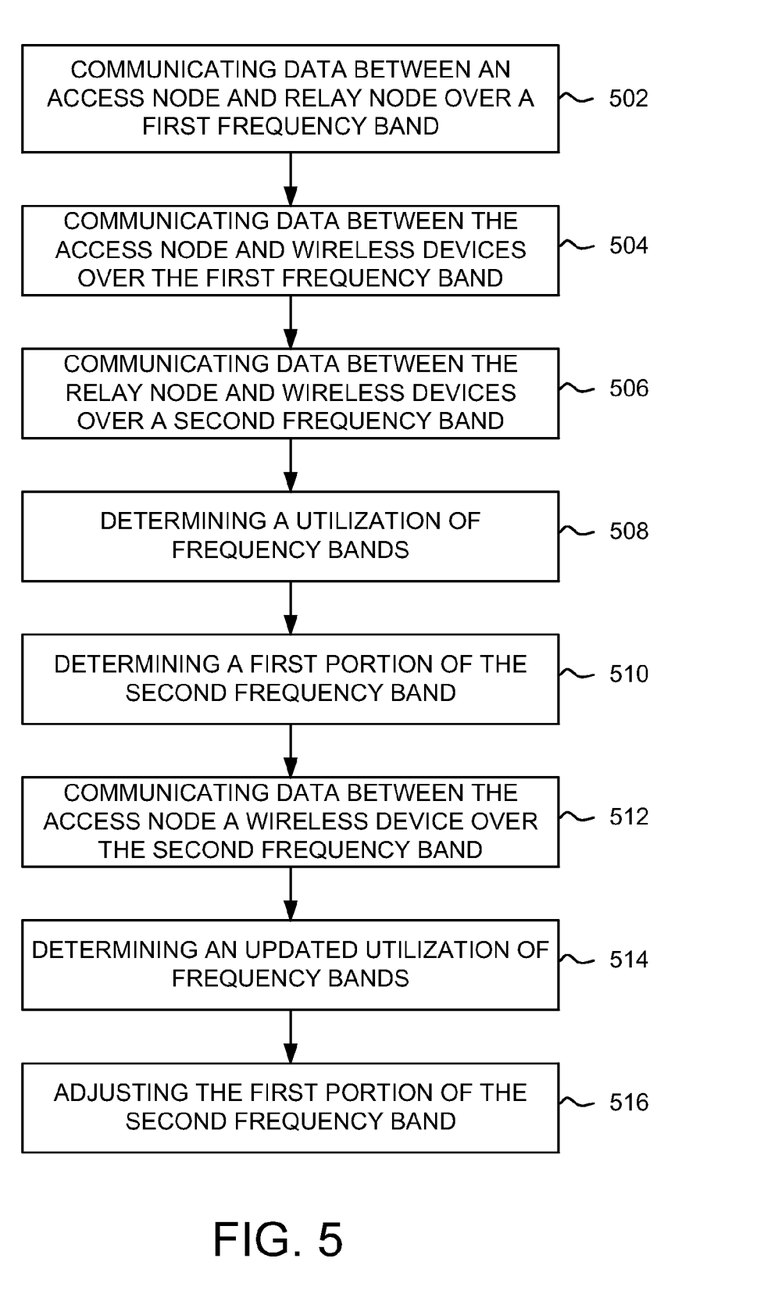
FIG. 5 illustrates another exemplary method of managing communications of an access node and a relay node.
Figure 6:
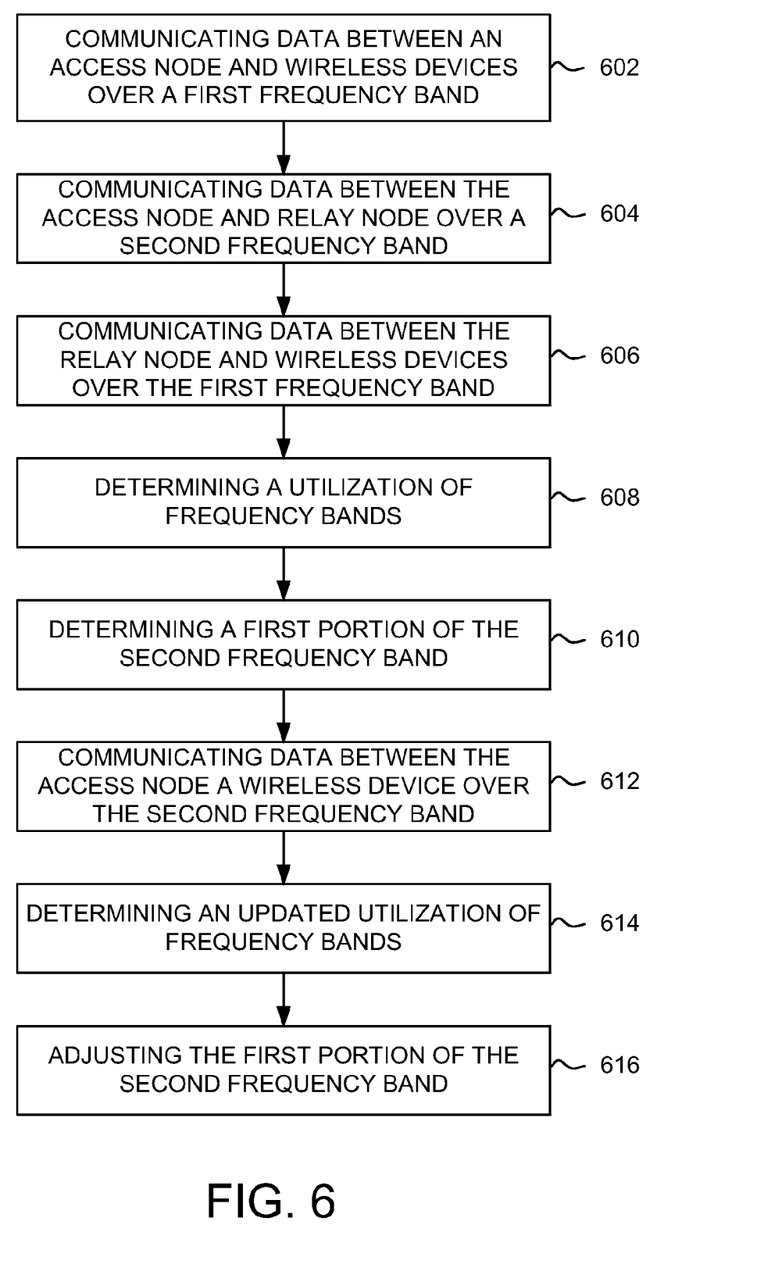
FIG. 6 illustrates another exemplary method of managing communications of an access node and a relay node.

In an embodiment, any of controller node 410, gateway node 412, one or more modules of access node 406, and one or more modules of relay node 408 may perform all or parts of the methods of FIGS. 3, 5, and 6.

In operation, access node 406 may establish communication with wireless device 402 such that access node 406 provides the wireless device access to a communication network (e.g., communication network 414). Similarly, relay node 408 may establish communication with wireless device 404 such that relay node 408 provides the wireless device access to a communication network (e.g., communication network 414).

In an embodiment, access node 406 may comprise a macro cell and relay node 408 may comprise a small cell (e.g., femto cell, pico cell, micro cell, or the like). For instance, the coverage radius for the macro cell may be larger than the coverage radius for the small cell. In this example, relay node 408 may communicate with access node 406 in order to communicate with controller node 410, gateway node 412, or communication network 414.

For example, access node 406 may be in communication with controller node 410, gateway node 412, or communication network 414 in order to provide wireless services for wireless devices 402 and 404. Controller node 410, gateway node 412, or communication network 414 may comprise a core network that may perform functions in order to provide wireless service for wireless devices 402 and 404. For example, an element of the core network (e.g., controller node 410) may instruct network elements to establish a data bearer for wireless device 402. Accordingly, a data bearer may be established throughout the core network such that data may be transmitted to and from wireless device 402 over the established data bearer. In another example, an element of the core network (e.g., gateway node 412) may enable wireless device 402 to communicate with an external data network (e.g., the Internet). Here, data may be communicated between gateway node 412 and wireless device 402 such that wireless device 402 may communicate with the external network (e.g., the Internet).

In an embodiment, relay node 408 may communicate with controller node 410, gateway node 412, or communication network 414 using access node 406. For example, relay node 408 may transmit data to access node 406 such that the transmitted data is used to enable wireless device 404 to access an external network (e.g., the Internet) or to enable wireless device 404 to use services provided by the core network (e.g., voice services). Here, communication link 420 may be used to communicate data between access node 406 and relay node 408. Access node 406 may then transmit the data to and from controller node 410, gateway node 412, or communication network 414. In an embodiment, relay node 408 may be in direct communication with controller node 410, gateway node 412, or communication network 414 (e.g., using communication links not depicted). Here, relay node 408 may directly communicate with one of controller node 410, gateway node 412, or communication network 414 for a first portion of traffic between the network elements and may use access node 406 for a second portion of traffic between the network elements. In another embodiment, relay node 408 may be in communication with a second access node (not depicted). Here, relay node 408 may communicate with one of controller node 410, gateway node 412, or communication network 414 using access node 406 for a first portion of traffic between the network elements and may communicate using the second access node for a second portion of traffic between the network elements.

In an embodiment, access node 406 and relay node 408 may communicate over the air (e.g., communication link 420 may comprise a wireless communication link). Accordingly, a frequency band from a set of frequency bands may be used for communication between access node 406 and relay node 408. In addition, the set of frequency bands may be used for other wireless communication (e.g., communication between access node 406 and wireless devices in communication with access node 406, communication between relay node 408 and wireless devices in communication with relay node 408, and the like). A system that efficiently allocates wireless spectrum to access node 406 and relay node 408 may provide enhanced services to wireless devices using communication system 400.

FIG. 5 illustrates an exemplary method to route data traffic based on network conditions. The method will be discussed with reference to the exemplary communication system 400 illustrated in FIG. 4, however, the method can be implemented with any suitable communication system.

Referring to FIG. 5, at step 502, data may be communicated between an access node and a plurality of wireless devices over a first frequency band. For example, access node 406 may be capable of communicating with network elements (e.g., wireless devices, relay nodes, and the like) over a set of frequency bands. Access node 406 may communicate data with wireless device 402 over a first frequency band. For example, access node 406 may be instructed to communicate with wireless devices (e.g., wireless device 402) over the first frequency band.

At step 504, data may be communicated between the access node and a relay node over the first frequency band. For example, relay node 408 may be capable of communicating with network elements (e.g., wireless devices, access nodes, and the like) over a set of frequency bands. Access node 406 may communicate data with relay node 408 over the first frequency band. For example, access node 406 may be instructed to communicate with relay node 408 over the first frequency band. In this example, relay node 408 may also be instructed to communicate with access node 406 over the first frequency band.

At step 506, data may be communicated between the relay node and wireless devices over a second frequency band. For example, relay node 408 may communicate data with wireless devices (e.g., wireless device 404) over a second frequency band. In an embodiment, relay node 408 may be instructed to communicate with wireless devices (e.g., wireless device 404) over the second frequency band.

At step 508, it may be determined that a utilization of the second frequency band meets a criteria. For example, relay node 408 may communicate with wireless devices (e.g., wireless device 404) over the second frequency band. The utilization may comprise a number of subcarriers within the second frequency band being used for communication with wireless devices, a number of subframes within the second frequency band being used for communication with wireless devices, a number of connections using the second frequency band (e.g., a number of RRC connections), a data rate over the second frequency band (e.g., actual data rate per capacity data rate), a throughput over the second frequency band, and the like. The utilization may be compared to a utilization criteria (e.g., threshold number subcarrier used for data communication, threshold number of RRC connections, threshold data rate, threshold throughput, and the like), and it may be determined that the utilization meets the utilization criteria. For example, the utilization criteria may comprise a floor utilization that indicates the second frequency band is underutilized.

In an embodiment, a utilization of the first frequency band may be determined. For example, access node 406 may communicate with wireless devices (e.g., wireless device 402) over the first frequency band and may communicate with relay node 408 over the first frequency band. A utilization of the first frequency band by access node 406 may be determined. For example, the utilization may comprise a number of subcarriers within the first frequency band being used for communication with wireless devices, a number of subframes within the first frequency band being used for communication with wireless devices, a number of connections using the first frequency band (e.g., a number of RRC connections), a data rate over the first frequency band (e.g., actual data rate per capacity data rate), a throughput over the first frequency band, and the like.

At step 510, a first portion of the second frequency band may be determined based on the utilization of the second frequency band. For example, a first portion of the second frequency band may be determined based on a utilization of the second frequency band by relay node 408. The utilization of the second frequency band meeting the utilization criteria may indicate that the second frequency band is being underutilized (e.g., the utilization is below a threshold). Accordingly, a first portion of the second frequency band may be determined, where the first portion may be used for other wireless communications.

In an embodiment, the first portion may comprise a number of subframes (e.g. Transmission Time Intervals, TTIs) of the second frequency band. For example, in a time division duplex (TDD) system, a frame may comprise a number of subframes that include a mix of uplink subframes and downlink subframes. In some embodiments, a special subframe may also be used, for instance, as a guard between an uplink subframe and a downlink subframe. When using a TDD structure, an uplink subframe and a downlink subframe may be transmitted over the same frequency but at different times. Here, based on the utilization, a number of subframes that are not being utilized by relay node 408 may be determined and all or a part of those subframes may comprise the first portion.

In another embodiment, the first portion may comprise a number of subcarriers for the second frequency band. For example, in a frequency division duplex (FDD) system, one or more subcarriers may be used for uplink subframes while one or more second subcarriers are used for downlink subframes. When using a FDD structure, an uplink subframe and a downlink subframe may be transmitted at the same time, but over different frequencies. Here, based on the utilization, a number of subcarriers that are not being utilized by relay node 408 may be determined and all or a part of those subcarriers may comprise the first portion.

In an embodiment, the first portion may be based on the utilization of the first frequency band. For example, when the utilization of the first frequency band indicates a high utilization (e.g., utilization above a threshold utilization), the first portion may comprise a greater portion of the second frequency band (e.g., greater number of subframes, greater number of subcarriers, and the like), and when the utilization of the first frequency band indicates a low utilization (e.g., utilization below a threshold utilization), the first portion may comprise a smaller portion of the second frequency band (e.g., smaller number of subframes, smaller number of subcarriers, and the like). Here, a high utilization of the first frequency band may indicate high network congestion, and a greater portion of the second frequency band may be used to adjust the load on the network. Additionally, a low utilization of the first frequency band may indicate low network congestion, and a smaller portion of the second frequency band may be used to adjust the load on the network. In an embodiment, the first portion may be based on the utilization of the second frequency band and the utilization of the first frequency band.

At step 512, data may be communicated between the access node and at least one wireless device over the second frequency band based on the determination that the utilization of the second frequency band meets the utilization criteria. For example, access node 406 may communicate with wireless device 402 over the second frequency band based on the determination that the utilization of the second frequency band (e.g., the utilization of the second frequency band by relay node 408) meets the utilization criteria. In an embodiment, a portion of the second frequency band (e.g., the determined first portion) may be used for communication between access node 406 and wireless devices (e.g., wireless device 402).

In an embodiment, data may be communicated between the access node and at least one wireless device over the second frequency band based on the utilization of the second frequency band and based on the utilization of the first frequency band. For example, access node 406 may communicate with wireless device 402 over the second frequency band based on the determination that the utilization of the second frequency band meets the utilization criteria and based on the utilization of the first frequency band. Here, a first portion of the second frequency band may be determined based on the utilization of the second frequency and based on the utilization of the first frequency band. Access node 406 may communicate with wireless device 402 over the determined first portion of the second frequency band.

At step 514, an updated utilization of the second frequency band may be determined. For example, relay node 408 may communicate with wireless devices (e.g., wireless device 404) over the second frequency band. In an embodiment, access node 406 may also communicate with wireless devices over the second frequency band (e.g., a first portion of the second frequency band). Here, the updated utilization of the second frequency band by relay node 408 may be determined. In another example, the updated utilization of the second frequency band by both rely node 408 and access node 406 may be determined. The updated utilization may be determined after a period of time (e.g., a threshold period of time, a predetermined period of time, or the like) from step 508. The utilization may comprise a number of subcarriers within the second frequency band being used for communication with wireless devices, a number of subframes within the second frequency band being used for communication with wireless devices, a number of connections using the second frequency band (e.g., a number of RRC connections), a data rate over the second frequency band (e.g., actual data rate per capacity data rate), a throughput over the second frequency band, and the like.

In an embodiment, an updated utilization of the second frequency band and an updated utilization of the first frequency band may be determined. For example, access node 406 may communicate with wireless devices (e.g., wireless device 402) over the first frequency band and may communicate with relay node 408 over the first frequency band. An updated utilization of the first frequency band by access node 406 may be determined.

At step 516, a first portion of the second frequency band may be adjusted based on the updated utilization of the second frequency band. For example, a first portion of the second frequency band may be determined based on a utilization of the second frequency band by relay node 408 at step 510. The first portion of the second frequency band may be adjusted based on an updated utilization of the second frequency band. In an embodiment, the first portion may comprise a number of subframes (e.g. Transmission Time Intervals, TTIs) of the second frequency band. Here, based on the updated utilization, a number of subframes that are being utilized by relay node 408 may be determined and the first portion of the second frequency band may be adjusted based on the number of utilized subframes. Accordingly, where a low number of subframes are being utilized (e.g., a number below a threshold criteria) the first portion of the second frequency band may be increased (e.g., may comprise a larger number of subframes), and where a high number of subframes are being utilized (e.g., a number above a threshold criteria) the first portion of the second frequency band may be decreased (e.g., may comprise a smaller number of subframes).

In another example, the first portion may comprise a number of subcarriers for the second frequency band. Here, based on the updated utilization, a number of subcarriers that are being utilized by relay node 408 may be determined and the first portion of the second frequency band may be adjusted based on the number of utilized subcarriers. Accordingly, where a low number of subcarriers are being utilized (e.g., a number below a threshold criteria) the first portion of the second frequency band may be increased (e.g., may comprise a larger number of subcarriers), and where a high number of subcarriers are being utilized (e.g., a number above a threshold criteria) the first portion of the second frequency band may be decreased (e.g., may comprise a smaller number of subcarriers).

In an embodiment, the first portion may be based on the updated utilization of the second frequency band and the updated utilization of the first frequency band. For example, when the updated utilization of the first frequency band indicates a high utilization (e.g., utilization above a threshold utilization), the first portion may comprise a greater portion of the second frequency band (e.g., greater number of subframes, greater number of subcarriers, and the like), and when the updated utilization of the first frequency band indicates a low utilization (e.g., utilization below a threshold utilization), the first portion may comprise a smaller portion of the second frequency band (e.g., smaller number of subframes, smaller number of subcarriers, and the like). Here, a high utilization of the first frequency band may indicate high network congestion, and a greater portion of the second frequency band may be used to adjust the load on the network. Additionally, a low utilization of the first frequency band may indicate low network congestion, and a smaller portion of the second frequency band may be used to adjust the load on the network.

In an embodiment, data may be communicated between the access node and at least one wireless device over the adjusted first portion of the second frequency band. For example, access node 406 may communicate with wireless device 402 over the adjusted first portion of the second frequency band.

FIG. 6 illustrates an exemplary method for routing data traffic based on network conditions. The method will be discussed with reference to the exemplary communication system 400 illustrated in FIG. 4, however, the method can be implemented with any suitable communication system.

Referring to FIG. 6, at step 602, data may be communicated between an access node and a plurality of wireless devices over a first frequency band. For example, access node 406 may be capable of communicating with network elements (e.g., wireless devices, relay nodes, and the like) over a set of frequency bands. Access node 406 may communicate data with wireless device 402 over a first frequency band. For example, access node 406 may be instructed to communicate with wireless devices (e.g., wireless device 402) over the first frequency band.

At step 604, data may be communicated between the access node and a relay node over a second frequency band. For example, relay node 408 may be capable of communicating with network elements (e.g., wireless devices, access nodes, and the like) over a set of frequency bands. Access node 406 may communicate data with relay node 408 over a second frequency band. For example, access node 406 may be instructed to communicate with relay node 408 over the second frequency band. In this example, relay node 408 may also be instructed to communicate with access node 406 over the second frequency band.

At step 606, data may be communicated between the relay node and wireless devices over the first frequency band. For example, relay node 408 may communicate data with wireless devices (e.g., wireless device 404) over the first frequency band. In an embodiment, relay node 408 may be instructed to communicate with wireless devices (e.g., wireless device 404) over the first frequency band.

At step 608, it may be determined that a utilization of the second frequency band meets a criteria. For example, access node 406 may communicate with relay node 408 over the second frequency band. The utilization may comprise a number of subcarriers within the second frequency band being used for communication, a number of subframes within the second frequency band being used for communication, a data rate over the second frequency band (e.g., actual data rate per capacity data rate), a throughput over the second frequency band, and the like. The utilization may be compared to a utilization criteria (e.g., threshold number subcarrier used for data communication, threshold data rate, threshold throughput, and the like), and it may be determined that the utilization meets the utilization criteria. For example, the utilization criteria may comprise a floor utilization that indicates the second frequency band is underutilized.

In an embodiment, a utilization of the first frequency band may be determined. For example, access node 406 may communicate with wireless devices (e.g., wireless device 402) over the first frequency band. A utilization of the first frequency band by access node 406 may be determined. In an embodiment, a utilization of the first frequency band by access node 406 and relay node 408 may be determined, where relay node 408 may communicate with wireless devices over the first frequency band. For example, the utilization may comprise a number of subcarriers within the first frequency band being used for communication with wireless devices, a number of subframes within the first frequency band being used for communication with wireless devices, a number of connections using the first frequency band (e.g., a number of RRC connections), a data rate over the first frequency band (e.g., actual data rate per capacity data rate), a throughput over the first frequency band, and the like.

In an embodiment, access node 406 may communicate with wireless devices over the first frequency band and relay node 408 may communicate with wireless devices over the first frequency band, and an interference between these communications may be determined. For example, wireless devices (e.g., wireless device 402 and wireless device 404) may report signal levels for signals detected from access node 406 and relay node 408, and the reported signal levels may be analyzed. For example, the signal level may be represented by received signal strength indication (RSSI), reference signal received power (RSRP), reference signal received quality (RSRQ), signal to interference plus noise ratio (SINR), or any other suitable metric.

Here, the reported signal levels may be compared to expected signal levels. For example, a location for a wireless device may be estimated based on one or more of a global positioning system, detected signal levels (e.g., signal strength) for signals detected at the wireless device (e.g., signal triangulation), a modulation and coding scheme used to communicate with the wireless device, and any other suitable means for determining the location of the wireless device. Based on the location for the wireless device, an expected signal level may be determined, and the expected signal level may be compared to the detected signal level. In another example, the signal level metric (e.g., SINR) may indicate an interference based on the data received by the wireless device. Accordingly, an interference may be determined based on the reported signal levels.

At step 610, a first portion of the second frequency band may be determined based on the utilization of the second frequency band. For example, a first portion of the second frequency band may be determined based on a utilization of the second frequency band by access node 406 and relay node 408. The utilization of the second frequency band meeting the utilization criteria may indicate that the second frequency band is being underutilized (e.g., the utilization is below a threshold). Accordingly, a first portion of the second frequency band may be determined, where the first portion may be used for other wireless communications. In an embodiment, the first portion may comprise a number of subframes (e.g. Transmission Time Intervals, TTIs) of the second frequency band. Here, based on the utilization, a number of subframes that are not being utilized may be determined and all or a part of those subframes may comprise the first portion. In another example, the first portion may comprise a number of subcarriers for the second frequency band. Here, based on the utilization, a number of subcarriers that are not being utilized may be determined and all or a part of those subcarriers may comprise the first portion.

In an embodiment, the first portion may be based on the utilization of the first frequency band. For example, when the utilization of the first frequency band indicates a high utilization (e.g., utilization above a threshold utilization), the first portion may comprise a greater portion of the second frequency band (e.g., greater number of subframes, greater number of subcarriers, and the like), and when the utilization of the first frequency band indicates a low utilization (e.g., utilization below a threshold utilization), the first portion may comprise a smaller portion of the second frequency band (e.g., smaller number of subframes, smaller number of subcarriers, and the like). Here, a high utilization of the first frequency band may indicate high network congestion, and a greater portion of the second frequency band may be used to adjust the load on the network. Additionally, a low utilization of the first frequency band may indicate low network congestion, and a smaller portion of the second frequency band may be used to adjust the load on the network. In an embodiment, the first portion may be based on the utilization of the second frequency band and the utilization of the first frequency band.

In an embodiment, the first portion may be based on the determined interference. For example, when the determined interference indicates a high level of interference (e.g., interference above a threshold interference), the first portion may comprise a greater portion of the second frequency band (e.g., greater number of subframes, greater number of subcarriers, and the like), and when the determined interference indicates a low interference (e.g., interference below a threshold interference), the first portion may comprise a smaller portion of the second frequency band (e.g., smaller number of subframes, smaller number of subcarriers, and the like). In an embodiment, the first portion may be based on the utilization of the second frequency band, the utilization of the first frequency band, the interference, or any combination of these.

At step 612, data may be communicated between the access node and at least one wireless device over the second frequency band based on the determination that the utilization of the second frequency band meets the utilization criteria. For example, access node 406 may communicate with wireless device 402 over the second frequency band based on the determination that the utilization of the second frequency band (e.g., the utilization of the second frequency band by access node 406 and relay node 408) meets the utilization criteria. In an embodiment, a portion of the second frequency band (e.g., the determined first portion) may be used for communication between access node 406 and wireless devices (e.g., wireless device 402).

In an embodiment, data may be communicated between the access node and at least one wireless device over the second frequency band based on the utilization of the second frequency band and based on the utilization of the first frequency band. For example, access node 406 may communicate with wireless device 402 over the second frequency band based on the determination that the utilization of the second frequency band meets the utilization criteria and based on the utilization of the first frequency band. Here, a first portion of the second frequency band may be determined based on the utilization of the second frequency and based on the utilization of the first frequency band. Access node 406 may communicate with wireless device 402 over the determined first portion of the second frequency band.

At step 614, an updated utilization of the second frequency band may be determined. For example, access node 406 and relay node 408 may communicate over the second frequency band. In an embodiment, access node 406 may also communicate with wireless devices over the second frequency band (e.g., a first portion of the second frequency band). Here, the updated utilization of the second frequency band may be determined based on the communication between access node 406 and relay node 408. In another example, the updated utilization of the second frequency band by both rely node 408 and access node 406 may be determined. The updated utilization may be determined after a period of time (e.g., a threshold period of time, a predetermined period of time, or the like) from step 608. The utilization may comprise a number of subcarriers within the second frequency band being used for communication, a number of subframes within the second frequency band being used for communication, a data rate over the second frequency band (e.g., actual data rate per capacity data rate), a throughput over the second frequency band, and the like.

In an embodiment, an updated utilization of the second frequency band and an updated utilization of the first frequency band may be determined. For example, access node 406 may communicate with wireless devices (e.g., wireless device 402) over the first frequency band. An updated utilization of the first frequency band by access node 406 may be determined.

In an embodiment, access node 406 may communicate with wireless devices over the first frequency band and relay node 408 may communicate with wireless devices over the first frequency band, and an updated interference between these communications may be determined. For example, wireless devices (e.g., wireless device 402 and wireless device 404) may report signal levels for signals detected from access node 406 and relay node 408, and the reported signal levels may be analyzed. Here, the reported signal levels may be compared to expected signal levels. Accordingly, an updated interference may be determined based on the reported signal levels. The updated interference may be determined after a period of time (e.g., a threshold period of time, a predetermined period of time, or the like) from step 608. For example, the reported signal levels from the wireless devices may be received some time after the signal level reports used to determine the interference at step 608.

At step 616, a first portion of the second frequency band may be adjusted based on the updated utilization of the second frequency band. For example, a first portion of the second frequency band may be determined based on a utilization of the second frequency band by access node 406 and relay node 408 at step 610. The first portion of the second frequency band may be adjusted based on an updated utilization of the second frequency band. In an embodiment, the first portion may comprise a number of subframes (e.g. Transmission Time Intervals, TTIs) of the second frequency band. Here, based on the updated utilization, a number of subframes that are being utilized by access node 406 and relay node 408 may be determined and the first portion of the second frequency band may be adjusted based on the number of utilized subframes. Accordingly, where a low number of subframes are being utilized (e.g., a number below a threshold criteria) the first portion of the second frequency band may be increased (e.g., may comprise a larger number of subframes), and where a high number of subframes are being utilized (e.g., a number above a threshold criteria) the first portion of the second frequency band may be decreased (e.g., may comprise a smaller number of subframes).

In another example, the first portion may comprise a number of subcarriers for the second frequency band. Here, based on the updated utilization, a number of subcarriers that are being utilized by access node 406 and relay node 408 may be determined and the first portion of the second frequency band may be adjusted based on the number of utilized subcarriers. Accordingly, where a low number of subcarriers are being utilized (e.g., a number below a threshold criteria) the first portion of the second frequency band may be increased (e.g., may comprise a larger number of subcarriers), and where a high number of subcarriers are being utilized (e.g., a number above a threshold criteria) the first portion of the second frequency band may be decreased (e.g., may comprise a smaller number of subcarriers).

In an embodiment, the first portion may be based on the updated utilization of the second frequency band and the updated utilization of the first frequency band. For example, when the updated utilization of the first frequency band indicates a high utilization (e.g., utilization above a threshold utilization), the first portion of the second frequency band may be increased (e.g., greater number of subframes, greater number of subcarriers, and the like), and when the updated utilization of the first frequency band indicates a low utilization (e.g., utilization below a threshold utilization), the first portion of the second frequency band may be decreased (e.g., smaller number of subframes, smaller number of subcarriers, and the like).

In an embodiment, the first portion may be adjusted based on the updated interference. For example, when the updated interference indicates a high level of interference (e.g., interference above a threshold interference), the first portion of the second frequency band may be increased (e.g., greater number of subframes, greater number of subcarriers, and the like), and when the updated indicates a low interference (e.g., interference below a threshold interference), the first portion of the second frequency band may be decreased (e.g., smaller number of subframes, smaller number of subcarriers, and the like). In an embodiment, the first portion may be based on the updated utilization of the second frequency band, the updated utilization of the first frequency band, the updated interference, or any combination of these.

In an embodiment, data may be communicated between the access node and at least one wireless device over the adjusted first portion of the second frequency band. For example, access node 406 may communicate with wireless device 402 over the adjusted first portion of the second frequency band.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
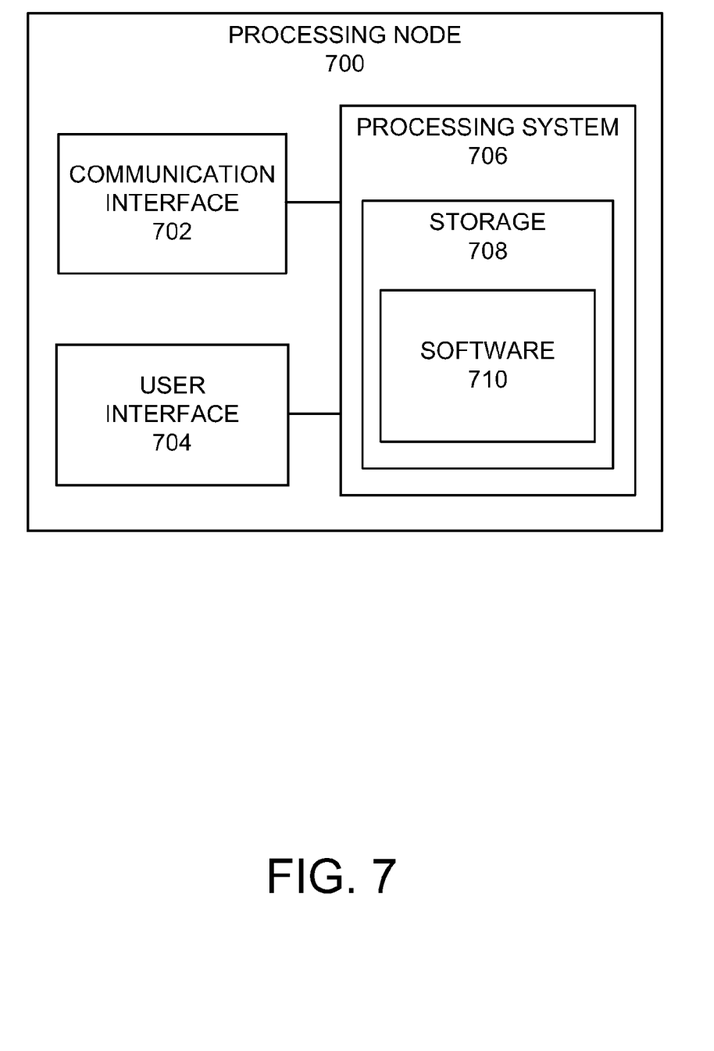
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 106 or 406, an element of relay nodes 108 or 408, and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for managing communications of an access node and a relay node, the method comprising:
    communicating data between an access node and a plurality of wireless devices over a first frequency band;
    communicating data between the access node and a relay node over the first frequency band, wherein the relay node communicates with wireless devices over a second frequency band;
    determining that a utilization of the second frequency band meets a criteria, wherein the utilization of the second frequency band comprises a number of subframes used by the relay node to communicate with wireless devices; and
    communicating data between the access node and at least one of the plurality of wireless devices over a first portion of the second frequency band based on the determination that the utilization of the second frequency band meets the criteria, wherein the first portion of the second frequency band comprises a subset of subframes available for transmitting data over the second frequency band, the subset being determined based on the utilization of the second frequency band.

2. The method of claim 1, further comprising:
    determining the first portion of the second frequency band based on the utilization of the second frequency band.

3. The method of claim 1, wherein a number of subframes within the subset is inversely proportional to the utilization of the second frequency band.

4. The method of claim 1, further comprising: communicating data between the relay node and wireless devices in communication with the relay node over a second portion of the second frequency band based on the determination that the utilization of the second frequency band meets the criteria.

5. The method of claim 1, wherein the utilization of the second frequency band comprises the utilization of the second frequency band by communication between the relay node and wireless devices in communication with the relay node.

6. The method of claim 1, further comprising:
determining an updated utilization of the second frequency band; and adjusting a number of subframes that comprise the first portion of the second frequency band based on the updated utilization.

7. A method for managing communications of an access node and a relay node, the method comprising:
communicating data between an access node and a plurality of wireless devices over a first frequency band;
communicating data between the access node and a relay node over a second frequency band, wherein the relay node communicates with wireless devices over the first frequency band;
determining that a utilization of the second frequency band meets a criteria, wherein the utilization of the second frequency band comprises a number of subframes used by the relay node to communicate with wireless devices; and
communicating data between the access node and at least one of the plurality of wireless devices over a first portion of the second frequency band based on the determination that the utilization of the second frequency band meets the criteria, wherein the first portion of the second frequency band comprises a subset of subframes available for transmitting data over the second frequency band, the subset being determined based on the utilization of the second frequency band.

8. The method of claim 7, further comprising:
determining the first portion of the second frequency band based on the utilization of the second frequency band.

9. The method of claim 7, wherein a number of subframes within the subset is inversely proportional to the utilization of the second frequency band.

10. The method of claim 7, further comprising:
communicating data between the access node and the relay node over a second portion of the second frequency band based on the determination that the utilization of the second frequency band meets the criteria.

11. The method of claim 7, wherein the utilization of the second frequency band comprises the utilization of the second frequency band by communication between the relay node and the access node.

12. The method of claim 7, further comprising:
determining an updated utilization of the second frequency band; and adjusting a number of subframes that comprise the first portion of the second frequency band based on the updated utilization.

13. A method for managing communications of an access node and a relay node, the method comprising:
instructing an access node to communicate with wireless devices over a first frequency band and with a relay node over the first frequency band;
instructing the relay node to communicate with wireless devices over a second frequency band and with the access node over the first frequency band;
determining that a utilization of the second frequency band meets a criteria, wherein the utilization of the second frequency band comprises a number of subframes used by the relay node to communicate with wireless devices; and
instructing the access node to communicate with at least one wireless device a first portion of the second frequency band based on the determination that the utilization of the second frequency band meets the criteria, wherein the first portion of the second frequency band comprises a subset of subframes available for transmitting data over the second frequency band, the subset being determined based on the utilization of the second frequency band.

14. The method of claim 13, further comprising:
determining the first portion of the second frequency band based on the utilization of the second frequency band.

* * * * *